United States Patent [19]

Otsuka et al.

[11] Patent Number: 5,144,462

[45] Date of Patent: Sep. 1, 1992

[54] LIQUID CRYSTAL PROJECTION COLOR DISPLAY APPARATUS HAVING MICROLENS ARRAYS WITH CONTROLLABLE REFRACTIVE POWER

[75] Inventors: Akira Otsuka, Amagasaki; Shin-Ichiro Ishihara, Takatsuki; Yoshito Miyatake, Neyagawa; Sadayoshi Hotta, Hirakata, all of Japan

[73] Assignee: Matsushita Electric Industrial Co., Ltd., Osaka, Japan

[21] Appl. No.: 620,883

[22] Filed: Nov. 29, 1990

[30] Foreign Application Priority Data

Dec. 5, 1989 [JP] Japan .................. 1-314360

[51] Int. Cl.⁵ .......................................... G02F 1/133
[52] U.S. Cl. ............................... 359/41; 359/54; 359/71; 359/319; 359/290; 353/31; 353/34
[58] Field of Search .............. 350/333, 339 F, 345, 350/347 V, 347 R, 334, 114, 128, 355, 359, 379; 353/31, 32, 34, 122; 358/61

[56] References Cited

U.S. PATENT DOCUMENTS

| | | | |
|---|---|---|---|
| 3,744,878 | 7/1973 | Kiemle et al. | 359/54 |
| 4,729,641 | 3/1988 | Matsuoka et al. | 350/347 V |
| 4,790,632 | 12/1988 | Miyakawa et al. | 350/347 V |
| 4,836,652 | 6/1989 | Oishi et al. | 350/339 R |
| 4,989,954 | 2/1991 | Yokoyama et al. | 350/339 F |
| 5,004,902 | 4/1991 | Matsui et al. | 350/347 V |
| 5,015,080 | 5/1991 | Cassarly et al. | 350/348 |
| 5,020,885 | 6/1991 | Shibaguchi | 359/319 |

FOREIGN PATENT DOCUMENTS

| | | | |
|---|---|---|---|
| 0262131 | 12/1985 | Japan | 350/337 |
| 0160715 | 7/1986 | Japan | 350/347 E |
| 63-216026 | 9/1988 | Japan . | |
| 01035416 | 2/1989 | Japan . | |
| 1-189685 | 7/1989 | Japan . | |
| 1-281426 | 11/1989 | Japan . | |
| 86-17501/27 | 11/1985 | U.S.S.R. . | |

Primary Examiner—Stanley D. Miller
Assistant Examiner—Tai V. Duong
Attorney, Agent, or Firm—Wenderoth, Lind & Ponack

[57] ABSTRACT

In a liquid crystal projection color display apparatus having three liquid crystal display devices used for red, green and blue light, each liquid crystal display device has a liquid crystal display panel and a microlens array disposed on the light-source side or the light-source and screen sides of the liquid crystal display panel. The microlens array has a controllable refractive power which is controlled by applying an electrtical power thereto. An electrical voltage is applied between transparent electrodes formed on both surfaces of a microlens array so that the refractive power of the microlens array can be made a value adapted to suit the corresponding one of red, green and blue light.

4 Claims, 6 Drawing Sheets

FIG. I-A
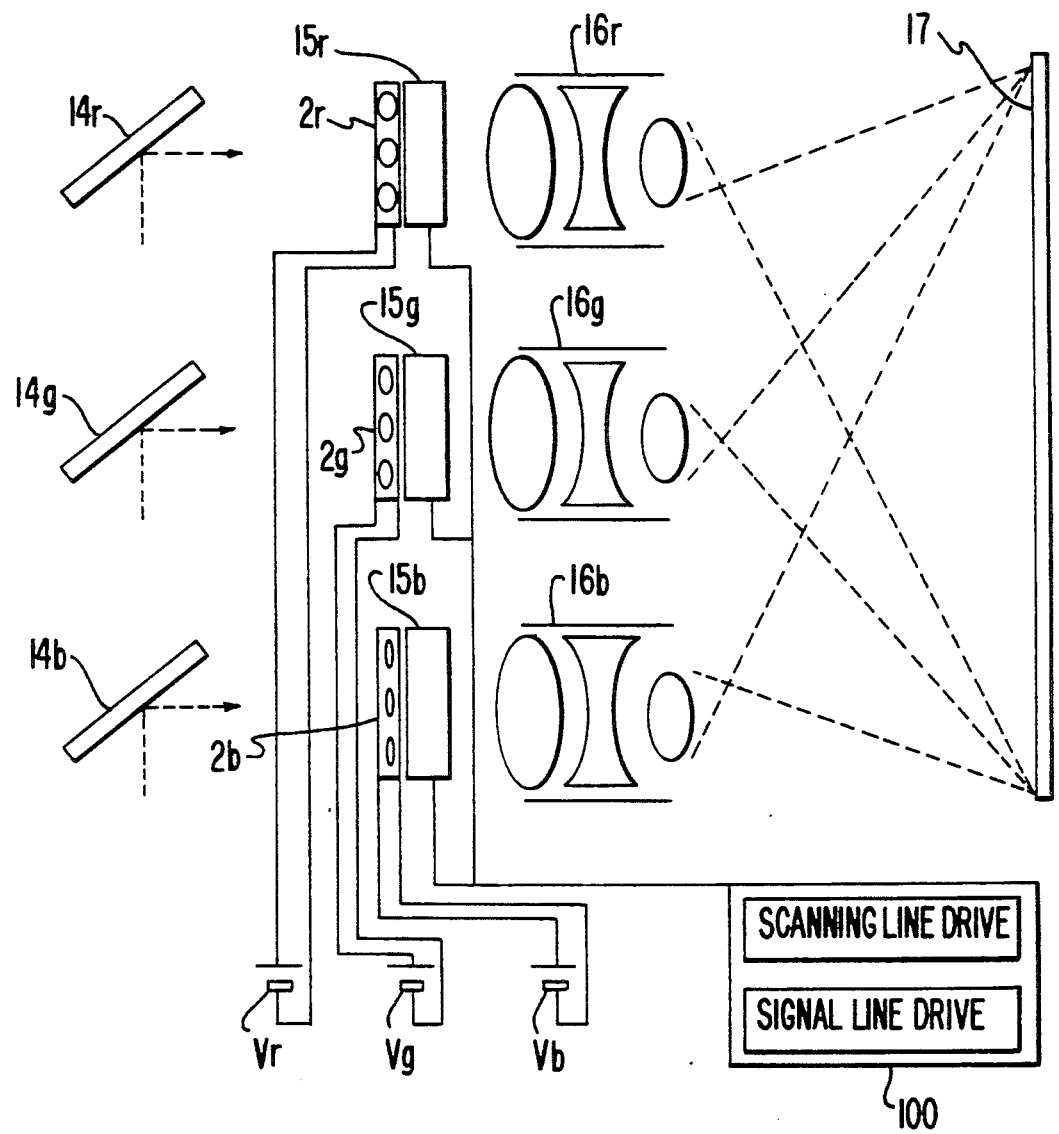
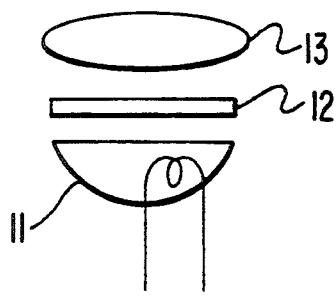

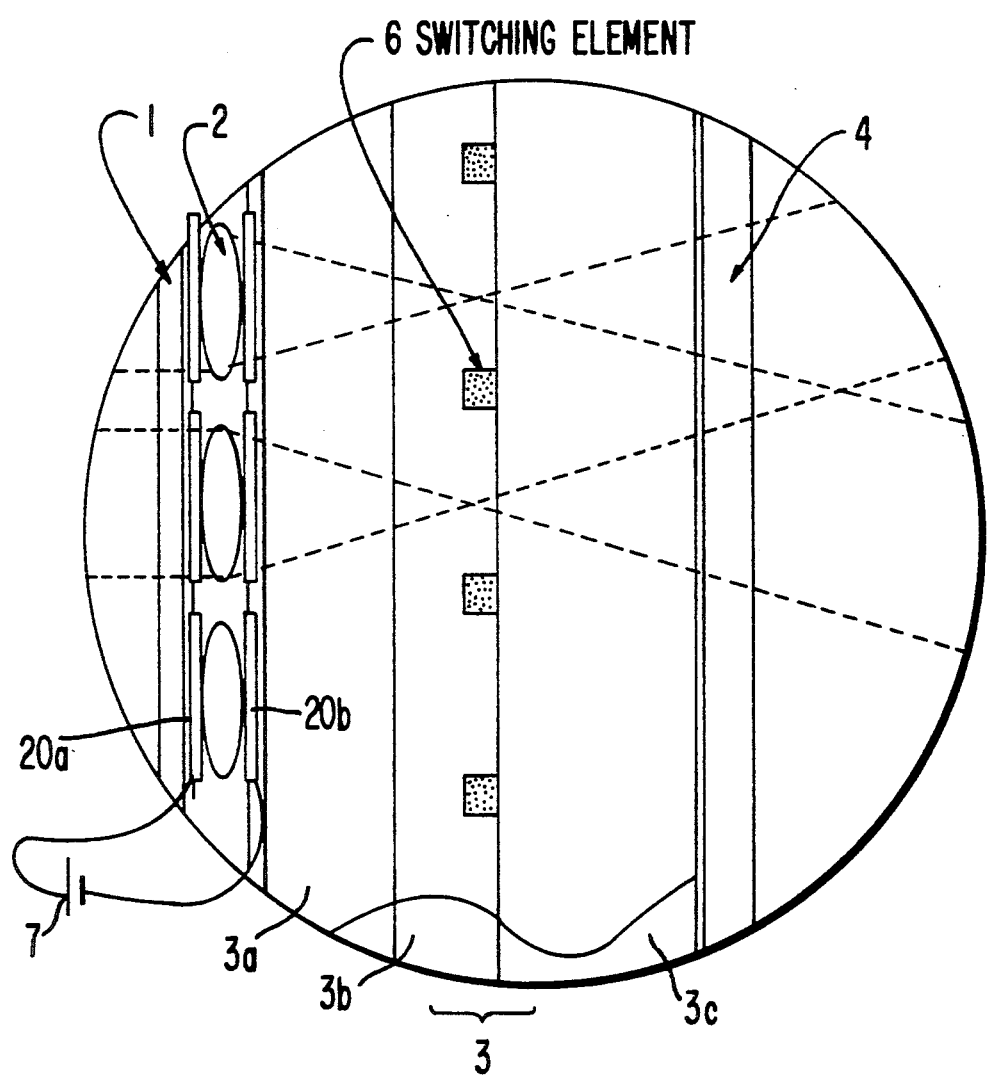

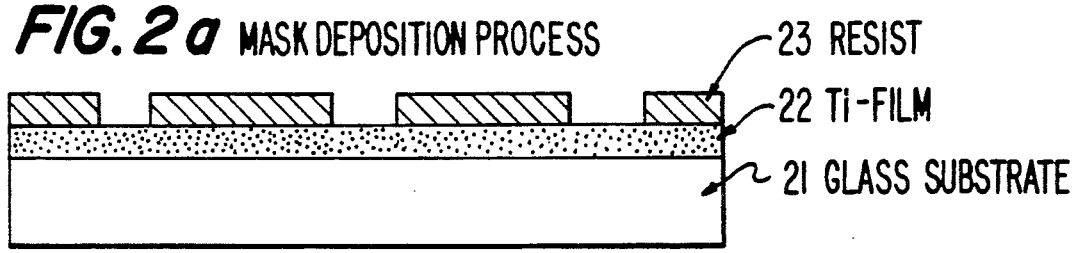
FIG. 2a MASK DEPOSITION PROCESS
- 23 RESIST
- 22 Ti-FILM
- 21 GLASS SUBSTRATE
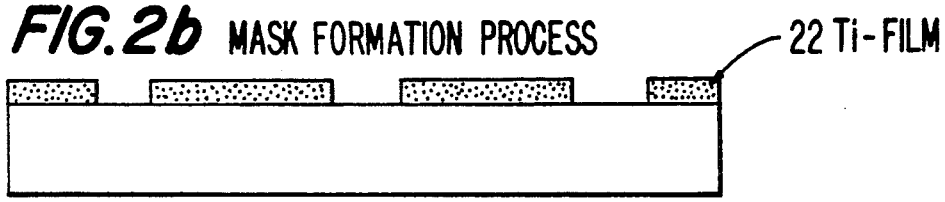
FIG. 2b MASK FORMATION PROCESS
- 22 Ti-FILM
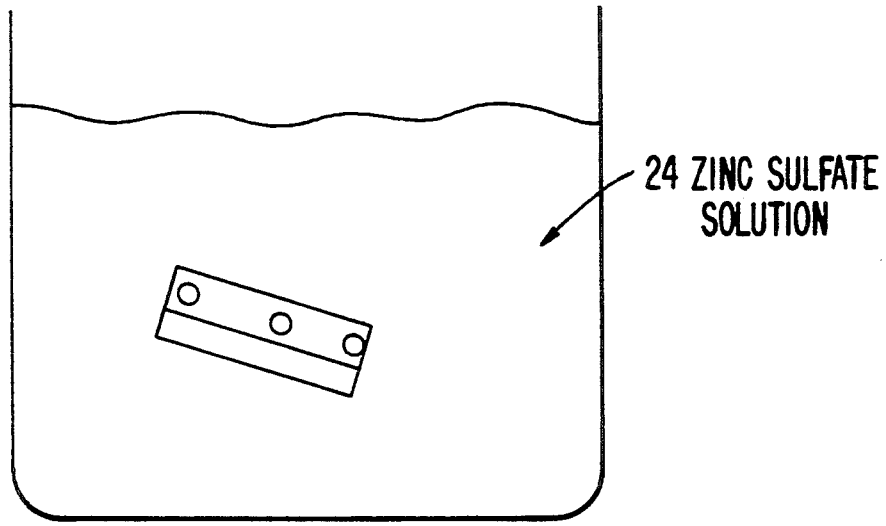
FIG. 2c ION EXCHANGE PROCESS
- 24 ZINC SULFATE SOLUTION
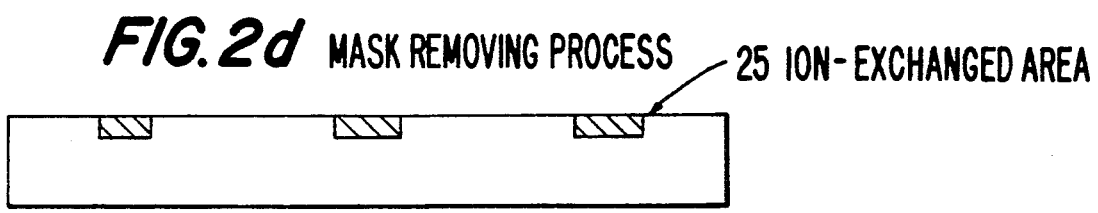
FIG. 2d MASK REMOVING PROCESS
- 25 ION-EXCHANGED AREA

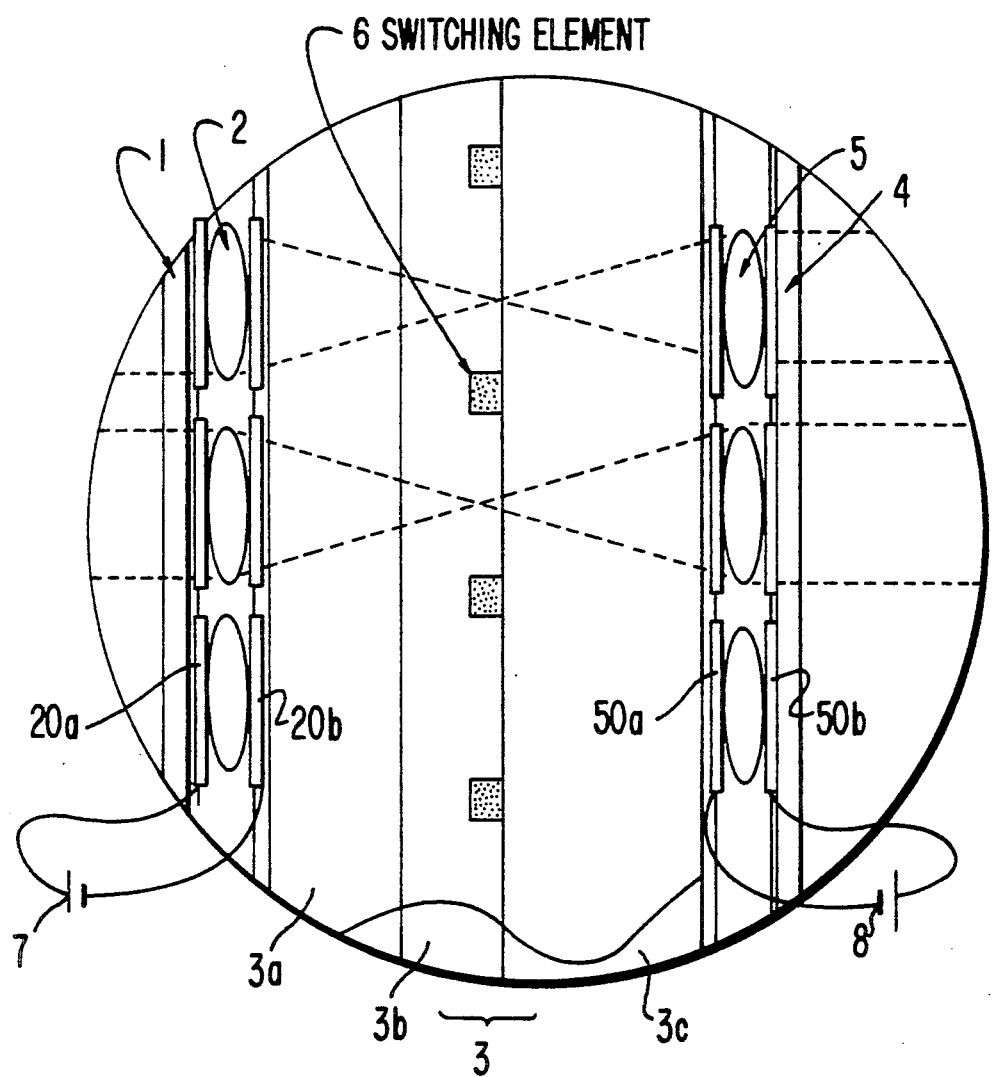

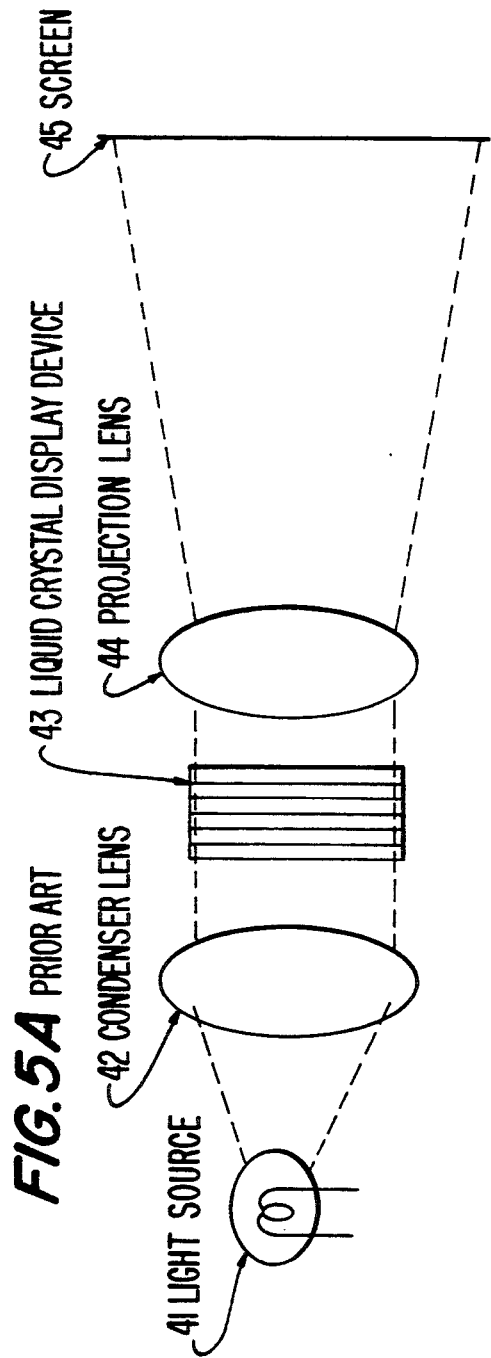
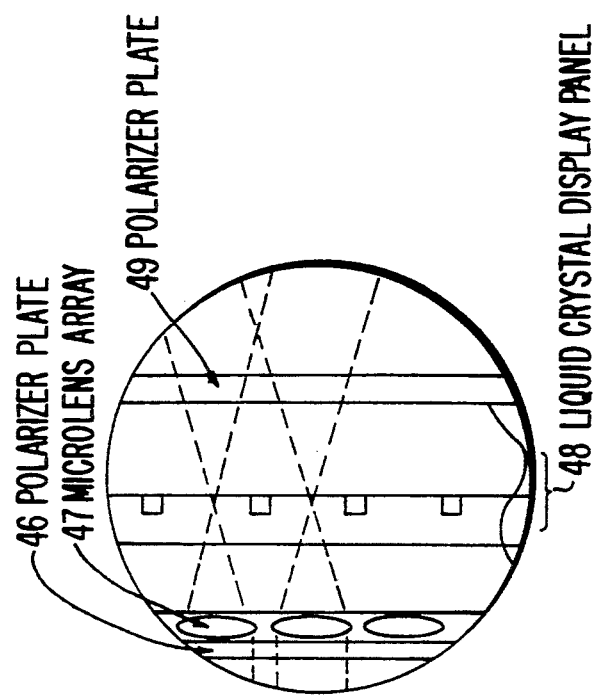
FIG. 5A PRIOR ART
FIG. 5B PRIOR ART

LIQUID CRYSTAL PROJECTION COLOR DISPLAY APPARATUS HAVING MICROLENS ARRAYS WITH CONTROLLABLE REFRACTIVE POWER

BACKGROUND OF THE INVENTION

1. Field of the Invention

This invention relates to a liquid crystal projection color display apparatus in which an optical image formed through a liquid crystal display device is illuminated by an illuminating light thereby projecting it through a projection lens on a screen.

2. Description of the Prior Art

Conventionally, a liquid crystal projection display apparatus having a microlens array arranged on the lightsource side of a liquid crystal display device, in which an optical image to be formed is illuminated by pixel through the microlens array by an illuminating light and expandably projected through a projection lens onto a screen (see, for example, Japanese Laid-Open Patent Application No. 1-189685 (1989). FIGS. 5A–5B schematically exemplify a liquid crystal projection display apparatus of this type. In FIGS. 5A–5B, element 41 is a light source element 42 is a condenser lens; element 43 is a liquid crystal display device; element 44 is a projection lens and element 45 is a screen. The liquid crystal display device 43 is illustrated in detail in the circle shown in FIG. 5B, which comprises a polarizer plate 46, a microlens array 47, a liquid crystal display panel 48 and a polarizer plate 49. The microlens array 44 has a plurality of microlenses each having a positive refractive power arranged in a matrix. An incident light inputted to the liquid crystal display panel 43 is made into a linearly polarized light through the polarizer plate 46, then condensed through the microlens array 47 subdivisibly on each of pixels arranged in a matrix of the liquid crystal display panel 48 and passes through the liquid crystal display panel 48. In this case, each light beam is expanded while being polarized by the liquid crystal display panel 48 and an optically modulated light passes through the polarizer plate 49. An output light from the liquid crystal display panel 43 is expanded through the projection lens 44 and sent to the screen 45 to project an image thereon. With this apparatus, a light once condensed through the microlens array 47 subdivisibly on each pixel of the liquid crystal display device 48 goes to the projection lens 44 while being subjected to divergence. The light thus divergently entering the projection lens 44 is expansibly outputted therefrom. As a result, if the distance between a liquid crystal display device and a projection lens exceeds a specific value, then signals of pixels adjacent to each other can be mixed systematically, resulting in adverse effects on a systematic basis. In addition, in case of the color display apparatus, images of three primary color light beams of red (R), green (G) and blue (B), must have an integrally identical magnification ratio. With the conventional technology, however, it is disadvantageously difficult to overcome such a problem.

SUMMARY OF THE INVENTION

An object of this invention is to provide a liquid crystal projection color display apparatus which has no difference in aperture ratio of a liquid crystal display device due to the difference in the color of light and three primary color image light beams projected at the same magnification, thus being capable of obtaining a high-resolution color image.

In order to attain the above-mentioned object, a liquid crystal projection color display apparatus of this invention has three liquid crystal display devices respectively for use with red, green and blue color lights. Each of the three liquid crystal display devices comprises a microlens array whose refractive power is controllable by applying an electric field, which serves to function as a condenser lens for condensing on incident light on each pixel for modulation and an electric field application means for applying an electric field to the microlens array.

In a preferred embodiment, a microlens array the ion of whose glass substrate is exchanged with a migratory ion can be used. Since the ion therewithin is migrated by applying an electric field, the refractive power can be varied. This means that by applying a suitable electric field to each microlens array of the three liquid crystal display devices, the refractive power in accordance with the color of a light can be provided to each microlens array. As a result, a light of any color can be condensed efficiently on each pixel, thus being capable of providing red, green and blue color images with the same magnification. Therefore, a color image can be projected on a screen with higher resolution and without giving any color shearing or spreading.

The electric field application means preferably comprises transparent electrodes disposed respectively on both sides of the microlens array and a voltage source for applying a voltage between the transparent electrodes. The transparent electrodes can be patterned so as to correspond to the pattern of the microlens array arranged in a matrix or disposed uniformly over the surface of the substrate.

Additionally to the microlens array, as each liquid crystal display device converts an output light into a parallel light, a second microlens array can be disposed on the screen side of each liquid crystal display device. If the output light from each of the three liquid crystal display devices is a parallel light, there are many advantages in that the system and projection display apparatus can be totally compactized on a design basis and so on. The second microlens array is preferable to have the same arrangement as that of the first microlens array disposed on the light-source side thereof as well as to be provided with an electric field application means.

BRIEF DESCRIPTION OF THE DRAWINGS

FIG. 1-A is a schematic view of a liquid crystal projection color display apparatus according to one embodiment of this invention.

FIG. 1-B cross-sectionally shows in detail a part of an example of a liquid crystal display device shown in FIG. 1-A or FIG. 3.

FIGS. 2a–2d exemplify a method of manufacturing a microlens array shown in FIG. 1-A.

FIG. 4 cross-sectionally shows in detail a part of another example of a liquid crystal display device shown in FIG. 1-A and FIG. 3.

FIGS. 5A–5B are a schematic view of a liquid crystal projection color display apparatus according to the prior art.

DESCRIPTION OF THE PREFERRED EMBODIMENTS

Figure 3:
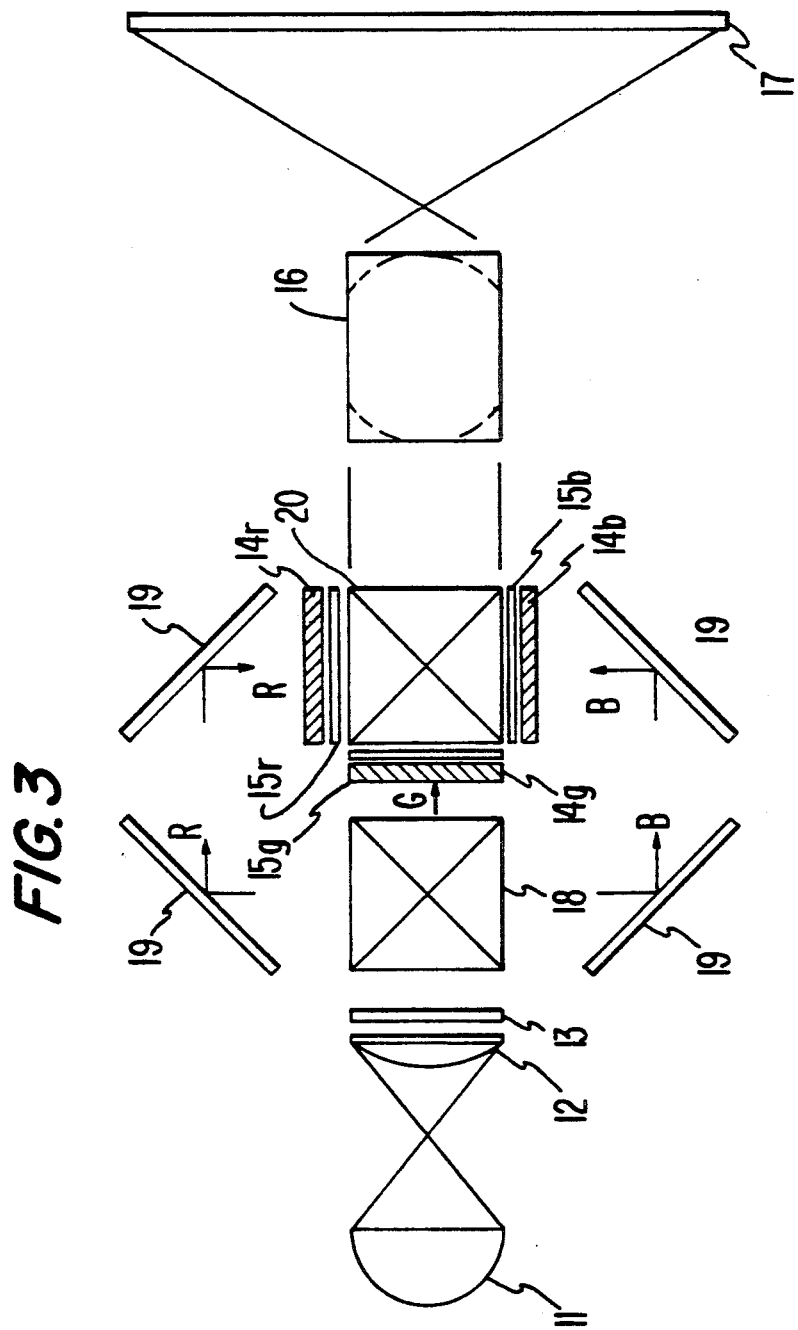
FIG. 3 is a schematic view of a liquid crystal projection color display apparatus according to another embodiment of this invention.

FIG. 1-A schematically shows a liquid crystal projection color display apparatus according to one embodiment of this invention. Element 11 is a light source; element 12 is an infrared cut filter; element 13 is a condenser lens; elements 14r, 14g and 14b are red-light reflecting dichroic mirror, a green-light reflecting dichroic mirror and a blue-light reflecting dichroic mirror, respectively; element 15r, 15g and 15b are each liquid crystal display devices; elements 2r, 2g and 2b are each microlens arrays; elements 16r, 16g and 16b are each projection lenses; element 17 is a screen, and element 100 is a drive circuit for driving the liquid crystal display devices 15r, 15g and 15b, including a scanning line drive circuit and a signal line drive circuit. The reference letters Vr, Vg and Vb each indicates a voltage source for applying an electric field to a corresponding one of the microlens arrays 2r, 2g and 2b to control their refractive powers. A white light outputted from the light source 11 is passed through the infrared cut filter 12 and collimated to render it into a parallel light through the condenser lens 13. The parallel light thus obtained goes to the blue-light reflecting dichroic mirror 14b, green-light reflecting dichroic mirror 14g and red-light reflecting dichroic mirror 14r in this order. The blue-light direction is changed through the blue-light reflecting dichroic mirror 14b into a direction toward the liquid crystal display device 15b. The blue-light thus inputted to the liquid crystal display device 15b is made into a linearly polarized light, then subdivisibly condensed on each of pixels arranged in a matrix, and subjected to polarization therethrough. The blue-light thus polarized is then subjected to expansion and the optically modulated light passes through the liquid crystal display device 15b. The light thus passed therethrough is expanded by the projection lens 16b to project a blue image on the screen 17. Next, the green-light passes through the blue-light reflecting dichroic mirror 14b and goes to the green-light reflecting dichroic mirror 14g to change its direction into a direction toward the liquid crystal display device 15g. The green-light thus inputted to the liquid crystal display device 15g is made into a linearly polarized light, then subdivisibly condensed on each of pixels arranged in a matrix, and subjected to polarization therethrough. The green-light thus polarized is then subjected to expansion and the optically modulated light passes through the liquid crystal display device 15g. The light thus passed therethrough is expanded by the projection lens 16b to project a green image on the screen 17. The red-light passes through the blue-light reflecting dichroic mirror 14b and green-light reflecting dichroic mirror 14g and goes to the red-light reflecting dichroic mirror 14r to change its direction into a direction toward the liquid crystal display device 15r. The red-light thus inputted to the liquid crystal display device 15r is made into a linearly polarized light, the subdivisibly condensed on each of pixels arranged in a matrix, and subjected to polarization therethrough. The red-light thus polarized is then subjected to expansion and the optically modulated light passes through the liquid crystal display device 15r. The light thus passed therethrough is expanded by the projection lens 16r to project a red image on the screen 17. Liquid crystal display devices 15b, 15g and 15r respectively have the microlens arrays 2b, 2g and 2r whose refractive powers are controlled by applying electric fields through the power sources Vb, Vg and Vr on their dichroic mirror sides.

Liquid crystal display devices 15b, 15g and 15r are each arranged as cross-sectionally shown in FIG. 1-B. Element 1 is a polarizer plate; element 2 is a microlens array disposed on the light-source side of each of the liquid crystal display devices 15b, 15g and 15r; element 3 is a liquid crystal display panel made by sandwiching a liquid crystal layer 3b between transparent substrates 3a and 3c; element 4 is another polarizer plate; element 6 are switching elements arranged in a matrix on the substrate 3c, element 7 is a direct-current voltage source connected to the transparent electrodes. Though not shown here, as is well-known, pixel electrodes which are connected to the switching elements 6 to form pixels are formed in a matrix on the substrate 3c and a common electrode opposing to the pixel electrodes is formed on the substrate 3a.

The microlens array 2 is made of same microlenses arranged in a matrix and has transparent electrodes 20a and 20b on its respective sides. By applying a voltage between the transparent electrodes 20a and 20b by the power source 7, an electric field is generated within each microlens. FIGS. 2a-2d show a method of manufacturing a microlens array. Element 21 is a glass substrate; element 22 is a titanium film; element 23 is a resist film; element 24 is a zinc sulfate solution and element 25 is an area where the ion exchange is made. FIG. 2a shows a mask depositing step for forming a titanium film on the glass substrate 21 and achieving the resist-patterning thereon. FIG. 2b shows a mask forming step at which the resist film patterned in the preceding step is transferred to the titanium film and then removed. FIG. 2c shows an ion exchanging step where the substrate thus obtained in the preceding step is immersed into a $ZnSO_4$ solution held at 300° C. or higher for two to three hours so as to thereby exchange the cation within the glass substrate with a $Zn^{2+}$ ion. FIG. 2d shows a mask removing stage where the back surface of the glass substrate thus obtained in the preceding step is ground, the titanium film is etched and then the annealing treatment is carried out. Thereafter, transparent electrodes 20a and 20b (see FIG. 1-B) are respectively disposed on the light-source side and the screen side of the microlens array thus prepared so as to apply an electric field for the microlens array from either side thereof responsibly to the corresponding one of the three primary color light beams. The $Zn^{2+}$ ion is migrated by the electric field generated by the application of a voltage between the electrodes 20a and 20b, leading to changing the refractive power of a microlens. As a result, proper selection of an electric field to be generated or a voltage to be applied makes it possible to have a microlens possessing the desired refractive power.

Referring to FIG. 1-B, the focal length of a microlens is designed as a distance from the surface of a microlens to the substrate surface on which the switching elements 6 are disposed of the liquid crystal display panel 3 with the wavelength to receive a green-light (545 nm). The liquid crystal display panel 3 and the microlens array 2 are bonded to each other. This is achieved in such a way that the positioning of the liquid crystal display panel 3 and the microlens array 2 is made by aligning the pixels at the four corners arranged in a matrix of the liquid crystal display panel 3 with the small lenses at the four corners arranged in a matrix of the microlens array 2, and then, a transparent adhesive having a refractive index close to that of a glass is injected between the liquid crystal display panel 3 and the microlens array 2. In this case, the reflection of a light from the surface of the liquid crystal display panel 3 or of the microlens array 2 can be reduced. For this, the expansion coefficient of the substrate of a liquid crystal display panel is required to be equal to that of the substrate of a microlens. In FIG. 1-A, the voltages Vr, Vg and Vr are set such as to satisfy the expression as Vb+Vr=Vg. In this case, however, it is preferable that each voltage source is of a variable voltage as well as be finely adjustable in order to compensate the variation of the characteristics of a microlens array.

In addition, in order to obtain a color image in this embodiment, three dichroic mirrors respectively for reflecting R, G and B lights, three liquid crystal display devices and three projection lenses are required to be arranged. However, the optical system in response to an image signal may be equipped with a liquid crystal display device for forming an image, a light source for outputting approximately parallel light to the liquid crystal display device and a projection lens. Further in addition, this embodiment uses three projection lens, however, as shown in FIG. 3, by arranging a mirror for synthesizing three primary color light beams next to the liquid crystal display device, the projection lens to be used can be made one in number.

In FIG. 3, element 19 is a mirror; element 18 is a dichroic prism for separating three primary color light beams; element 20 is a dichroic prism for synthesizing the three primary color light beams and element 16 is a projection lens. The dichroic prism changes in polarizing direction with wavelength.

In addition, in this embodiment, a liquid crystal display panel and a microlens array are separately arranged, even if the microlens array is formed within the transparent substrate 3a disposed oppositely to the side where the liquid crystal display panel 3 has the switching elements 6, it is in the application scope of this invention.

The manufacturing method of a microlens array in this embodiment forms lens elements having a same refractive index; however, a method in which a lens element is made by changing the ion exchange time in the ion exchange technique in response to the time corresponding to each of three primary color light beams, a method in which a lens element is made by changing the ion source in the ion exchange technique so as to thereby give it a different refractive index in response to each of three primary color light beams, a method in which a lens element is made by changing the ion source in the ion injection technique so as to thereby give it a different refractive index in response to each of three primary color light beams, or a method in which a lens element is made by changing the ion injection time in the ion injection technique in response to the time corresponding to each of three primary color light beams can be used for this purpose. Either way, the microlens array thus manufactured may have surface variation and lot variation resulting from the manufacturing process. As a result, it is preferable to optimize the refractive index by applying an electric field. For this, this invention can be effectively applied. Also, as the mask; a titanium film is used in this embodiment, however, a film of any such material that is insoluble in an ion exchange solution to be used and a mask removing solution to be used and does not etch the glass can be used for this purpose. In addition, if capable of providing a glass with the desired difference in refractive index and an ion exchange film having the desired thickness, the ion exchange solution, the solution temperature and the ion exchange time are in the application scope of this invention.

Next, another example of a liquid crystal display device shown in FIG. 1-A or FIG. 3 is illustrated in FIG. 4, in which a microlens array is disposed on each surface of a liquid crystal display panel. Element 1 is a polarizer plate; element 2 is a first microlens array; element 3 is a liquid crystal display panel; element 4 is another polarizer plate; element 5 is a second microlens array having transparent electrodes 50a and 50b on its respective surfaces; elements 6 are switching elements used for the liquid crystal display panel 3, and element 7 and 8 is power source connected to the transparent electrodes of the first microlens array 2 and a power source connected to those of the second microlens array 5, respectively. An approximately parallel light is condensed through the first microlens array 2 on the substrate surface of the liquid crystal panel 3 where the switching elements 6 are disposed and then, the light that starts to expand after passing through the panel 3 is returned through the second microlens array 5 to an approximately parallel light. The fact that the output light from the liquid crystal display device is a parallel light makes a liquid crystal projection color display apparatus of this invention advantageous on a design basis as well as a compactization basis. In these embodiments, the substrate of a liquid crystal display panel and that of a microlens array are separated, however, such a method that each microlens array is arranged between two glass substrates for forming a liquid crystal display panel and an electric field is applied to each microlens array is in the application scope of this invention.

What is claimed is:

1. A projection color display apparatus for imaging a color image comprising:
    a light source means for outputting three primary color light beams of red, green and blue as approximately parallel light beams;
    three liquid crystal display device means each for passing a corresponding one of said three primary color light beams so as to thereby form an optical image in accordance with an image signal; and
    projection lens means for projecting said optical image on a screen;
    said three liquid crystal display device means each including a liquid crystal display panel having a plurality of pixels arranged in a matrix, a microlens array arranged on the light-source side of said liquid crystal display panel and having a plurality of microlenses formed in a matrix and a refractive power which is controllable by an application of an electric field, and an electric field application means for applying a predetermined electric field in accordance with said corresponding one of said three primary color light beams to said microlens array so as to thereby make each of said plurality of microlenses have a predetermined refractive power; wherein said predetermined electric field is applied simultaneously with said corresponding one of said three light beams.

2. A projection color display apparatus as claimed in claim 1, wherein said electric field application means comprises first and second transparent electrodes respectively formed on two surfaces of said microlens array, and a voltage application means for applying a voltage between said first and second transparent electrodes.

3. A projection color display apparatus for imaging a color image comprising:
- a light source means for outputting three primary color light beams of red, green and blue as approximately parallel light beams;
- three liquid crystal display device means each for passing a corresponding one of said three primary color light beams so as to thereby form an optical image in accordance with an image signal; and
- projection lens means for projecting said optical image on a screen;
- said three liquid crystal display device means each including a liquid crystal display panel having a plurality of pixels arranged in a matrix, a first microlens array and a second microlens array respectively disposed on the light-source side and the screen side of said liquid crystal panel and having a plurality of microlenses formed in a matrix and having a refractive powers which are controllable by an application of an electric field, and an electric field application means for applying a predetermined electric field in accordance with said corresponding one of said three primary color light beams to each of said first and second microlens arrays so as to thereby make each of said plurality of microlenses have a predetermined refractive power, thus being capable of outputting approximately parallel light from said predetermined second microlens array; wherein said electrical field is applied simultaneously with said corresponding one of said three light beams.

4. A projection color display apparatus as claimed in claim 3, wherein said electric field application means comprises first and second transparent electrodes respectively formed on two surfaces of each of said first and second microlens array, and a voltage application means for applying a voltage between said first and second transparent electrodes.

* * * * *